(12) United States Patent
Keller et al.

(10) Patent No.: US 7,761,186 B2
(45) Date of Patent: Jul. 20, 2010

(54) AUTOMATED LIGHTING AND BUILDING CONTROL SYSTEM

(75) Inventors: Carl Keller, Carson City, NV (US); James McLellen Freeman, Jr., Sparks, NV (US)

(73) Assignee: TLC Integration, LLC, Sparks, NV (US)

( * ) Notice: Subject to any disclaimer, the term of this patent is extended or adjusted under 35 U.S.C. 154(b) by 304 days.

(21) Appl. No.: 12/011,704

(22) Filed: Jan. 28, 2008

(65) Prior Publication Data

US 2009/0149973 A1 Jun. 11, 2009

(51) Int. Cl.
*G05D 23/00* (2006.01)
*E05F 15/20* (2006.01)

(52) U.S. Cl. .................. 700/277; 160/5; 315/84
(58) Field of Classification Search ........... 700/277; 160/5; 315/84
See application file for complete search history.

(56) References Cited

U.S. PATENT DOCUMENTS

| 4,401,976 A | 8/1983 | Stadelmayr |
| 5,489,827 A | 2/1996 | Xia |
| 5,530,322 A | 6/1996 | Ference |
| 5,962,989 A * | 10/1999 | Baker .................. 315/294 |
| 5,986,357 A | 11/1999 | Myron |
| 6,388,399 B1 * | 5/2002 | Eckel et al. ............ 315/312 |
| 7,190,126 B1 | 3/2007 | Paton |
| 2003/0233172 A1 * | 12/2003 | Granqvist et al. ........ 700/276 |
| 2005/0097162 A1 * | 5/2005 | Budike, Jr. ............ 709/201 |
| 2007/0273307 A1 * | 11/2007 | Westrick et al. ......... 315/312 |

* cited by examiner

*Primary Examiner*—Ryan A Jarrett
(74) *Attorney, Agent, or Firm*—SilverSky Group, LLC

(57) ABSTRACT

An automated lighting and building control system that is operative to control a large number of lights and to provide control to other control systems, such as security systems, powered window coverings, and HVAC systems, within a geographic area based on a large amount of input data, including day light conditions, occupancy data, security information, HVAC data, etc. The savings generated by the control system are measurable and verifiable and enable the operator of the controlled space to analyze exactly how the controlled space is being utilized. To improve the quality of the overall control system, the present invention utilizes a universal occupancy adapter for converting any motion detector for a security system, into a component of the lighting/building controller. Further, the entire system can be controlled remotely over the Internet without the need for special software.

23 Claims, 4 Drawing Sheets

AUTOMATED LIGHTING AND BUILDING CONTROL SYSTEM

BRIEF DESCRIPTION OF THE INVENTION

The present invention relates generally to automated lighting controllers and more particularly to an automated lighting and building control system that is operative to control a large number of lights and other control systems, such as security systems, powered window coverings, and HVAC systems, within a geographic area based on a large amount of input data, including day light conditions, occupancy data, security information, HVAC data, etc. The present invention also facilitates the remote control of the system over an Internet connection.

BACKGROUND OF THE INVENTION

A number of lighting control systems have been developed that sense the amount of daylight in a room or building (a "controlled space") and automatically adjust the lumen output of lights installed, typically fluorescent lights, in that controlled space to save money on energy expenses. U.S. Pat. No. 7,190,126 ("Paton") provides an example of a daylight control system, which utilizes a controller, programmed through a portable commissioning system that includes a light sensor, to control a plurality of ballasts, each controlling one or more lights in the controlled space. Aside from the impracticality of relying on a portable light sensor to read daylight levels in the controlled space, the Paton system is also limited by the manner in which the controller communicates with the ballasts.

Each ballast sends and receives large amounts of data. For example, a ballast will send data about its status (its operating condition), how bright the lights are that it is controlling, and its power consumption, while receiving data about how bright the lights should be, whether they should be on or off, etc. See U.S. Pat. No. 5,530,322 for an example of a multi-zone lighting controller system. When a large number of ballasts are being controlled, the amount of data becomes enormous and overwhelms the controller, or at least significantly slows the operation of the system, thereby inhibiting the efficiency of the system and its ability to save money by controlling the amount of light being used at any given point in time.

As noted above, the use of a portable light sensor is impractical because light levels within a controlled space with windows or skylights change constantly as a day goes by and someone cannot be economically employed to walk around all day testing light levels. Daylight levels in the morning are very different from mid-day and evening levels. Likewise, atmospheric conditions, such as clouds passing before the sun, can cause short to long-term changes in the amount of available daylight. To have a truly cost-effective solution, daylight levels must be constantly measured and the lights adjusted accordingly. Moreover, it is not enough to just control the lights in a room, especially one with many windows or skylights, because sometimes too much daylight will be let in. Accordingly, it is desirable to control powered window coverings to increase or decrease natural daylight in addition to controlling the level of artificial light in a controlled space.

In addition to measuring light, it is desirable to measure motion within the controlled space so that a space will not be unnecessarily illuminated. For example, many controlled spaces, such as a warehouse, a gym or a room within an office, do not need to be illuminated (or fully illuminated) when no one is in that space. As much as forty to fifty percent of energy consumption in the commercial sector is attributable to lighting, second only to heating and air conditioning. Lighting and HVAC automation would therefore help to decrease energy use and reduce costs.

Motion detectors integrated with a timing device, referred to herein as an occupancy sensor, have been used to control lighting within a controlled space. See U.S. Pat. No. 5,489,827 for an example of a light controller with an occupancy sensor. A primary disadvantage of such occupancy sensors is that they often incorrectly turn on the lighting system, referred to as a false on or nuisance on. While dual technology occupancy sensors (which use both a passive infrared sensor and an ultrasonic sensor) help to prevent false ons, they can still be falsely activated by HVAC systems. To overcome the HVAC limitation, the security industry has used triple technology occupancy sensors (with microwave sensors as the third type of sensor) to help reduce false alarms. U.S. Pat. No. 4,401,976 illustrates a multiple sensor sec system. While triple technology sensors have not typically been used in the lighting/building control industry, U.S. Pat. No. 5,986,357 does illustrate the use of a triple technology occupancy sensor for a variety of applications, including lighting control. Unfortunately, the triple technology sensors available on the market are not easily adapted for use in lighting/building control systems. A solution is needed to universally adapt any type of motion sensor into a lighting/building control system.

Furthermore, while lighting control systems are typically installed in a controlled space by an electrical contractor, security systems are typically installed by a security system contractor, and HVAC systems are typically installed by an HVAC contractor. As a result, each controlled space ends up being equipped with three different control systems and three different control panels for controlling lighting, security and HVAC. A solution is needed that allows a single system to control lighting and to provide common control signals to security, HVAC and other automated systems within a controlled space.

DETAILED DESCRIPTION OF THE INVENTION

The present invention relates generally to automated lighting controllers and more particularly to an automated lighting and building control system that is operative to control a large number of lights and provide common control signals to other control systems, such as security systems, powered window coverings, and HVAC systems, within a geographic area based on a large amount of input data, including day light conditions, occupancy data, security information, HVAC data, etc. The savings generated by the control system are measurable and verifiable and enable the operator of the controlled space to analyze exactly how the controlled space is being utilized. To improve the quality of the overall control system, the present invention utilizes a universal occupancy adapter for converting any motion detector for a security system, into a component of the lighting/building controller. Further, the entire system can be controlled remotely over the Internet without the need for special software.

Because three sensor motion detectors, comprising passive infrared, ultrasonic, and microwave sensors, are the least likely to produce false ons, they are the ideal motion detectors for reliable occupancy light/building controllers. However, currently available three sensor motion detectors are manufactured and marketed primarily for use only as security devices. The adapter of the present invention provides for the conversion of any type of motion sensor, including a commercially available three-sensor security motion detector, into a occupancy sensor for a lighting/building controller. Furthermore, while the three-sensor configuration is ideal for reliable lighting control, the adapter can be used to convert any type of motion detector into a timed lighting control device. The adaptation of any motion detector into an occupancy sensor allows the consumer to pick the motion detector that will produce the best results for their specific needs.

Figure 1:
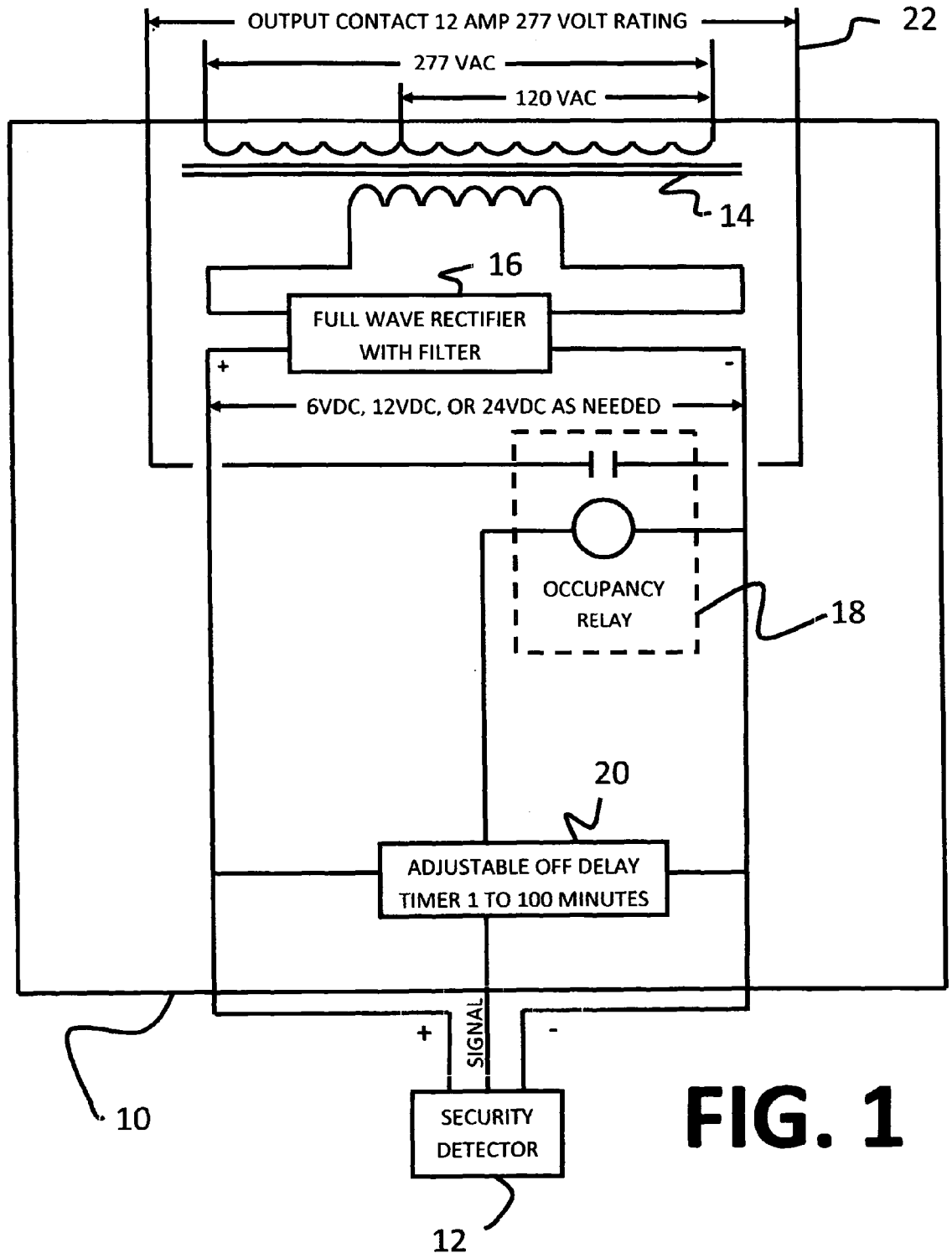
FIG. 1 is a diagram of a security to occupancy adaptor where the security motion detector signals a timer, which activates the lighting system of a zone.

FIG. 1 illustrates a universal motion adapter 10 for converting a motion detector, such as security motion detector 12, into an occupancy sensor for a lighting control system. The adapter 10 includes a power transformer 14 for converting AC power into appropriate DC power. In this case, the power transformer 14 is converting either 277 volt or 120 volt AC power from the building or controlled space power supply to DC power, with the assistance of the full wave rectifier with filter 16. The resulting 6 volt, 12 volt or 24 volt DC power is then used to provide power to the other components of the adapter, occupancy relay 18 and timer 20, as well as the security detector 12. The occupancy relay 18 is also connected to an output contact 22 that supplies power to one or more sets of lights controlled by the adapter 10. The timer 20 is connected to both the occupancy relay 18 and the security motion detector 12.

The security motion detector 12 continuously senses for the presence of an occupant within a specified area or zone. This zone can range in size from a portion of a room to an entire building. The smaller the zone, the greater the energy saving potential, as less lighting would be activated based on the presence of an occupant in that zone. The zone can refer not only to an area but also to a specified grouping of lighting fixtures.

Once the security motion detector 12 detects motion, a motion signal is sent from the detector 12 to the delay timer 20. The timer 20 can be programmed to run for one to one-hundred minutes (or more) after it receives a signal from the security motion detector 12. When the timer 20 is activated, an occupancy signal is sent to the occupancy relay 18 to close the output contact 22 so that power will be provided to the lights in the zone. If the timer 20 is already running when a signal is received from the security motion detector 12, the timer 20 will simply reset to the maximum time for which it was programmed, without sending an additional occupancy signal, since the relay 18 is already closed. This resetting of timer 20 ensures that the lights in the zone will remain on when an occupant is in the zone. If the time 20 is not reset, it will run until its maximum time since last reset and then turn off. When the timer 20 turns off, an occupancy signal is sent to the occupancy relay 18 to open the output circuit and thereby turn off power to the lights in the zone.

The ideal security motion detector 12 detects the presence of an occupant in a zone utilizing a series of three motion sensors. The first motion sensor is a passive infra-red sensor (PIR). A PIR sensor monitors changes in temperature of a zone. Therefore, the PIR sensor will recognize an occupant entering the area by monitoring the change in temperature of the area caused by the occupant's body heat. The second motion sensor is a microwave sensor. Microwave sensors send radio frequency signals in the microwave portion of the RF spectrum into an area and measure the amount of time it takes for the signals, which are reflected by objects in the controlled space, to return to the sensor. When an occupant enters the controlled space, the signals are reflected by the occupant, thereby altering the amount of time the signals are normally reflected and indicating a new movement in the controlled space. The final sensor is an ultrasonic sensor, which works in a manner similar to the microwave sensor, but which uses ultrasonic sound waves instead of microwaves.

Because all three alarms have advantages and disadvantages, a combination of three sensors working in unison greatly increases the reliability of the occupancy detector for light management. By requiring all three sensors to detect motion, the system will be less vulnerable to false triggering, especially due to HVAC systems. PIR sensors are the least susceptible to false ons; however, PIR sensors lack sensitivity over distances greater than fifteen feet and are subject to "dead spots" where the PIR sensors are not directly scanning. PIR sensors also decrease reliability at temperatures greater than 85 degrees Fahrenheit and can be falsely alarmed due to rapid changes in temperature caused by a building's HVAC system.

Ultrasonic sensors do not have the same "dead spots" experienced by PIR sensors, but ultrasonic sensors are more sensitive than PIR sensors, thereby creating a higher probability of false ons. Ultrasonic sensors are commonly susceptible to false ons caused by moving air from a building's HVAC system. The ultrasonic signals are capable of being reflected by the moving air. Microwave sensors are not affected by a building's HVAC system, but they can alarm because of harmless movement, such as a rattling door or moving fan blades. Microwave sensors are also capable of passing through non-metallic doors and windows and detecting motion outside the desired range. By requiring all three sensors to detect motion to activate the alarm, the possibility of false ons, especially due to a building's HVAC system, is greatly diminished.

While a triple technology sensor is preferred, the adapter can operate with any security motion detector. For example, the adapter could be implemented with whatever security motion detectors already exist within the controlled space. Using an all ready existing security motion detector will not only reduce the initial cost required to implement an occupancy detector, but will reduce the cost of operating multiple sensors for different control systems and cut down on the number of sensors that have to be installed within the controlled space. Tying the lighting system to the security system through use of the same sensors has a number of added benefits as well. For example, if someone was seeking to illegally enter the controlled space, they might think to override the security system to prevent an alarm signal from being sent to the police or a monitoring company, but they probably would not think to override the lighting system. As a result, once motion was detected within the controlled space when it should not be, the lights could be set to create a form of alarm, such as flashing on and off quickly to alert anyone passing by or a video monitoring company, etc.

Likewise, the lighting and security systems could be tied together through common sensors with the fire alarm system within the controlled space. Tying the lighting and fire systems together, at least, has a number of additional benefits. For one, most building fire codes require a certain amount of light (emergency lighting) to be on at all times in the event there is a fire in a building. This requirement exists because fire marshals do not want to take any chances assuming a building is unoccupied just because the lights are off. However, keeping lights on at all times adds significant energy expense to the operation of a building and adds to global warming. The only way to get around such fire codes is to prove that a building is empty. By tying the lighting system to the fire system, it would be possible to assure the fire marshals that the lights are on when the building is occupied and off when it is not occupied, such that there is no need for emergency lighting. Another advantage is that the lighting system could be set to light all lights to their maximum level (referred to as "full brilliance") whenever a fire alarm occurred. This way, fire fighters would be assured of as much light as possible within the building, at least until power to the building was interrupted.

A related benefit of the combined systems (lighting, security, fire, HVAC, etc.) is that it gives the operator of the controlled space the ability to analyze exactly how the controlled space is being used at all times. The hours during which the controlled space, or portions of the controlled space, is occupied can be used to more efficiently use the controlled space. For example, if the occupants rarely entered one part of the controlled space, that part could be treated differently than it had been, i.e., provided less heating or cooling than other parts of the space, or had its contents relocated to a different part of the space or even offsite, such as in storage. This type of system also gives the operator of the controlled space the ability to accurately measure and verify energy consumption and savings from its use of the present invention.

By measuring the intensity of light in the controlled space, it is possible to determine how much light is actually needed within a space by the users. For example, if the occupants in a space only require 50 foot candles, but the lights in the space are generating 100 foot candles, then the lights in the space can be dimmed down to meet the actual needs of the occupants. By measuring the amount of daylight in a space and measuring how that daylight affects the lighting of the space, it is possible to control the lights to accommodate the daylight and to adjust shades to cut back on daylight when it is too intense. By measuring the percentage of lights used or the group of lights used within a space, it is possible to program the lighting characteristics for a space to match exactly how that space is being used. All of these measurement techniques enhance the present invention's ability to control costs and verify the savings an operator can or will realize.

Measurable and verifiable savings are determined by measuring the amount of power that is actually being used divided by the amount of power that would have been used without the lighting/building control of the present invention. Power is measured according to power company standards of watts/hour, where power usage is measured every five minutes and then averaged over fifteen minutes of each hour. This standard of measure can also be easily verified by a third party. Since power companies charge customers according to watts/hour, the cost savings can be readily calculated.

Figure 2:
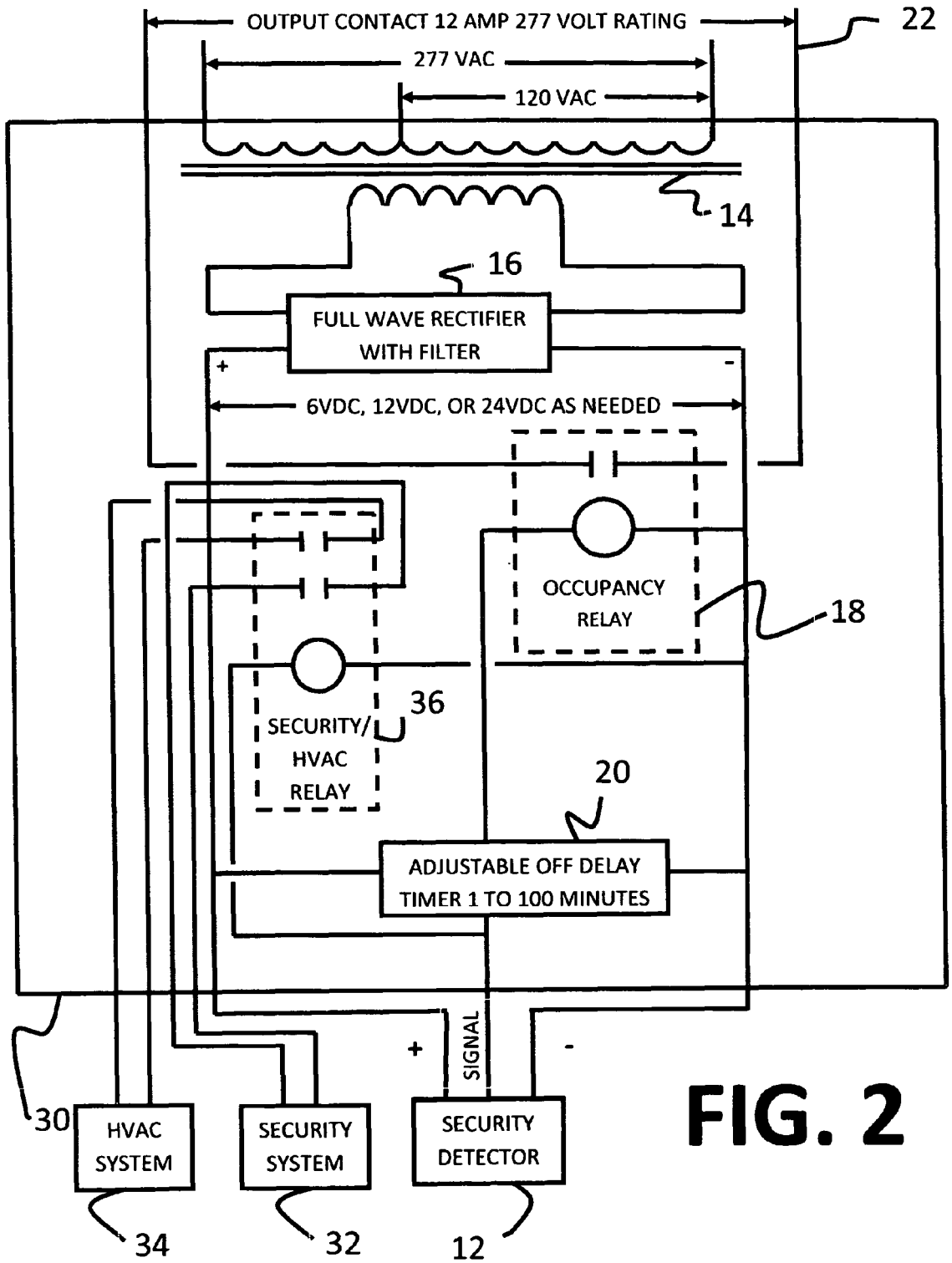
FIG. 2 is a diagram of a security to occupancy adapter where the security motion detector signals a timer, which activates the lighting system, HVAC system, and security system of a zone.

As previously noted, in addition to lighting, the security motion detector 12 can also be used to control other energy consuming devices. FIG. 2 illustrates one embodiment in which an adapter 30, in addition to controlling the zone's lighting, is used to provide some level of control to security system 32 and HVAC system 34. To provide control to these additional systems, one or more security/HVAC relays 36 are included in the adapter 30 (only one is shown in FIG. 2 serving both purposes), which like the occupancy relay 18 close either the circuit for the security system 32 or the HVAC system 34 to activate those additional systems. While a security system 32 and HVAC system 34 are illustrated in FIG. 2, any number and combination of energy consuming devices could be likewise controlled with the adapter 30.

As illustrated in FIG. 2, when an authorized occupant exits the controlled space and desires to secure the space, the occupant would enable the security system 32. Once activated, if the security motion detector 12 sensed movement, the detector 12 would send a signal that by-passes the adjustable off delay timer 20 and directly triggers the security/HVAC relay 36. The relay 36 would then close the circuit of the security system 32, thereby triggering the security system 32, which would otherwise continue to control itself.

The HVAC system 34 is similarly controlled. After the security motion detector 12 senses motion, it would send a signal to the adjustable off delay timer 20. As long as the timer 20 continues to run, the circuit for the lights and the HVAC system would continue to operate. Once the motion detector no longer senses motion or the presence of humans, the timer 20 would run out and the circuit to the HVAC system would be open. The circuit from the HVAC relay to the HVAC system 34 can be used to control the HVAC system 34 in different ways, such as turning the HVAC system 34 on or off or simply signaling the HVAC system 34 to adjust the temperature because an occupant was now in the controlled space. The controls for the HVAC system would still operate the HVAC system. For example, the HVAC system could be set to maintain a low default temperature in the winter, such as 55° F., and then raise the temperature to 69° F. when motion was detected. As long as motion continued to be detected and the time 20 remained on, the HVAC system would maintain the higher temperature, but as soon as the timer ran out, the HVAC would drop to maintaining the default lower temperature.

Figure 3:
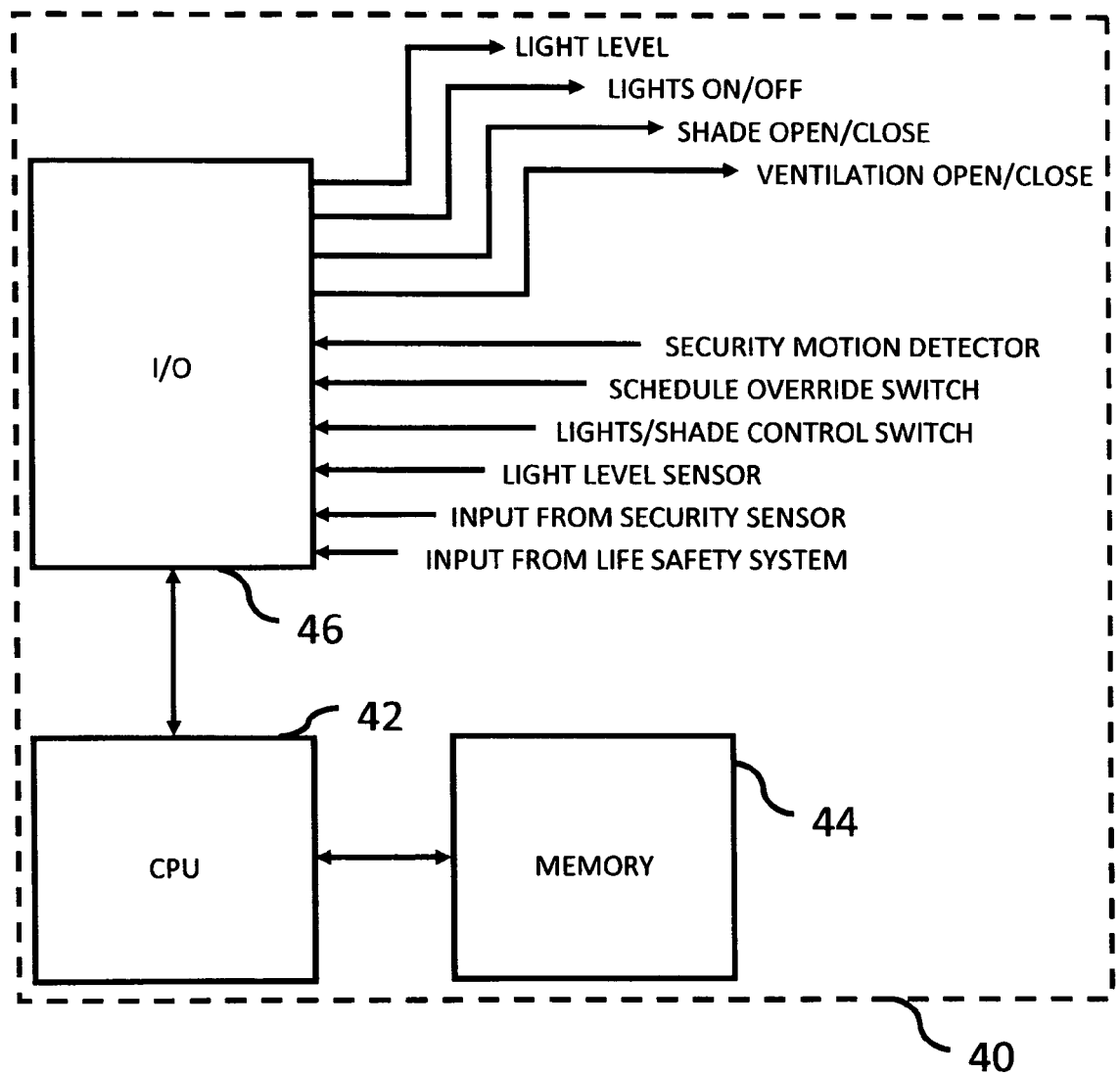
FIG. 3 is a block diagram of a zone lighting/building controller.

While the present system could be utilized in a home or smaller commercial space, it has its greatest utility in large commercial spaces, such as office buildings, schools, warehouses, and the like, where there are a large number of lights and other systems to control. When used in such environments, numerous adapters, each controlled by a single controller, are used to operate numerous different systems within one or more zones. As illustrated in FIG. 3, a zone lighting controller 40 includes a CPU 42, a memory 44, and input/output port or controller 46. The adapters 10 and 30 illustrated in FIGS. 2 and 3 are incorporated into the controller 40 through the I/O controller 46 and the CPU 42, which perform the hardware functions illustrated in FIG. 1 and FIG. 2 using a combination of hardware and software. These functions include communicating with the security motion detector, setting and running a timer and operating appropriate circuit relays. Although not show in FIG. 3, the transformer 14, rectifier 6 and output contact 22 would also be incorporated into the controller 40. The memory 44 is used to support the operation of the CPU 42 and to store historical information for controlled space utilization analysis.

The controller 40 receives inputs from a number of different remote devices, including the security motion detector 12 or other security sensors (or any other device). Since the functions of the adapters illustrated in FIGS. 1 and 2 and discussed above are included in the controller 40 and managed by software, it is not necessary to receive timing and control functions from the adapters 10 and 30. Thus, raw input from different security sensors could be used instead. Alternatively, the adapters 10 and 30 could be used with a much simpler control system (than that illustrated in either FIG. 3 or 4) that do not include the hardware/software controls of controller 40.

Inputs from other devices (not shown) include a schedule override switch, which permits manual operation of all controlled systems, a lights/shade control switch, which permits manual operation of just the lights and/or shades, a light level sensor for determining the number of foot candles of illumination or lumen currently being generated by the controlled lights, and an input from a life safety system, such as a fire alarm system or carbon monoxide detector. While two of the inputs are labeled to correspond to a security sensor and a life safety system, these inputs are optional and could be left open or substituted for many other types of general inputs. Hence, there could be many more inputs and multiple different inputs of the same type. For example, the life safety system could be a single system that provides a single input, or multiple different systems, such as a fire system, CO detector, sprinkler system, etc.

The outputs from the I/O 46 include light level signals, which set the candle output for the lights controlled by that controller 40, on/off signals for the controlled lights, open/close signals for the shades, and open/close signals for ventilation vents. As previously noted, the shade signals allow the controller 40 to regulate the amount of daylight being allowed into the controlled space by opening and closing shades as necessary. Also while it was previously noted that the adapter 30 enables a security motion detector to control an HVAC system, the controller 40 further extends the manner in which HVAC can be controlled within a controlled space. For example, by sharing the occupancy sensor, it would be possible to bring the HVAC out of a night setback mode in order to make the space comfortable for people working after hours.

Figure 4:
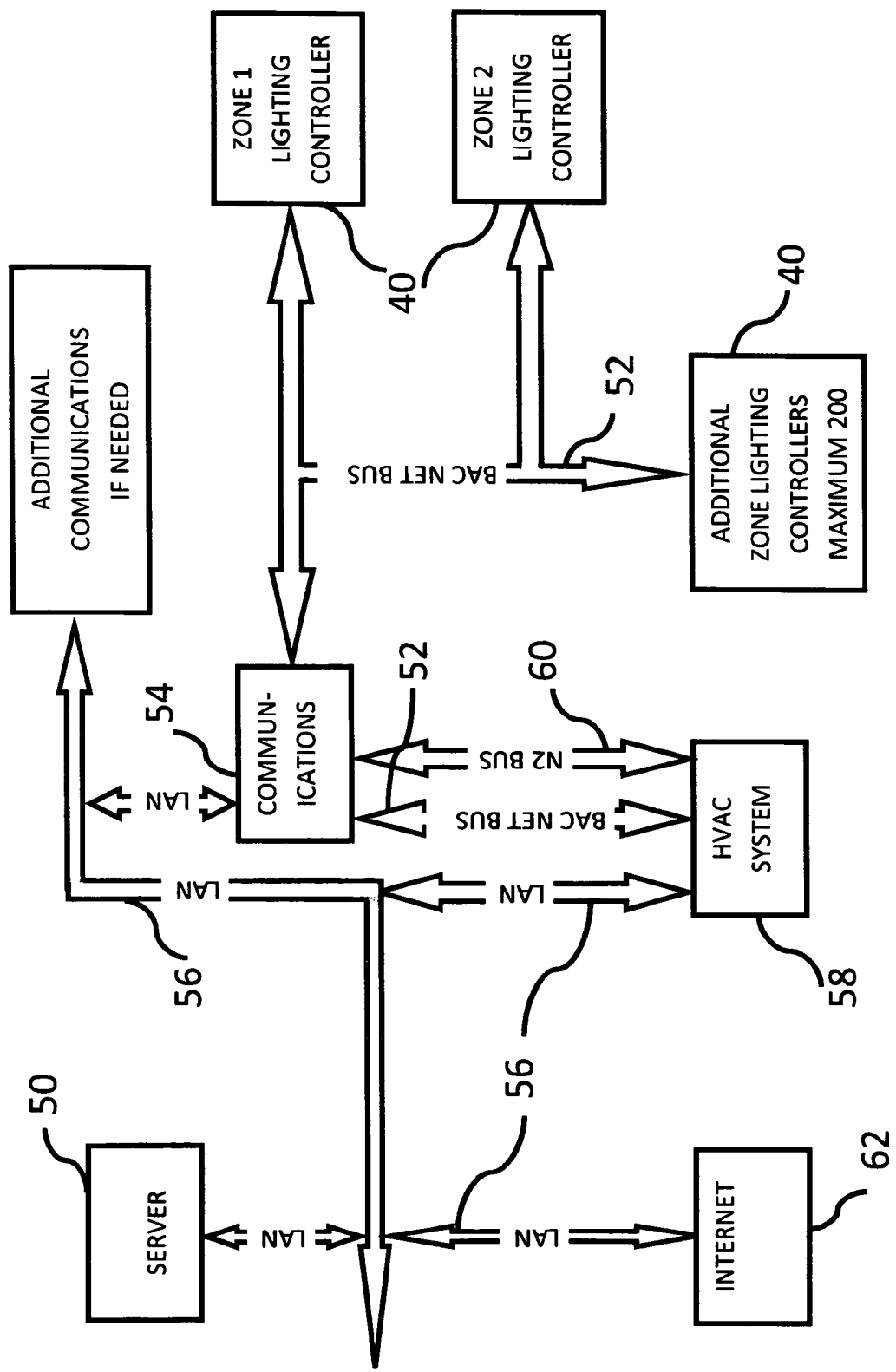
FIG. 4 is a block diagram of a lighting/building control system incorporating a plurality of the zone lighting/building controllers illustrated in FIG. 3.

FIG. 4 illustrates a preferred embodiment of the lighting/building control system of the present invention for managing a large number of zone lighting controllers 40 within a controlled space and at least an HVAC system. Each of the zone lighting controllers 40 has the same inputs and outputs to I/O 46 and its own CPU 42 and memory 44, and the ability to act independently of the master computer controller (server 50) in the event of a loss of communications between a controller 40 and the server 50. As shown in FIG. 4, the BACnet bus 52 is capable of supporting at total of 200 zone lighting controllers 40. Since the number of buses 52 is only limited by the number of IP addresses, theoretically, with an unlimited number of IP addresses, there could be an unlimited number of zone lighting controllers in a single system.

BACnet is an acronym for Building Automation and Control NETwork, which is a data communication protocol developed by the American Society of Heating, Refrigerating and Air-Conditioning Engineers (ASHRAE). The BACnet protocol has been adopted as the standard in the United States, Europe, more than 30 countries, and by ISO. The BACnet bus 52 is connected to the communications controller 54, which manages the flow of data through the BACnet bus 52, the local area network (LAN) 56, and any other buses in use in the system. As illustrated in FIG. 4, the HVAC system 58 is shown with a number of alternative communication connections. The master controller/server 50 could communicate with the HVAC System 58 directly over the LAN 56, or through the communication controller 54 and either the BACnet bus 52 or an N2 bus 60. The N2 bus 60 is a well known local network (proprietary to Johnson Control) that links a network control module, such as communications controller 54, with a controller or interface of a device, such as the HVAC System 58.

This optional connection configuration enables the HVAC System 58 to be controlled by the master computer controller/server 50 or a separate HVAC server connected to the LAN 56. The flexible configuration is desirable when there are multiple zone controllers 40 in operation at one time, as shown in FIG. 4. With this configuration, the zone lighting controllers can each control the lights within their zones and relay occupancy and additional information to the communications controller 54. From the communications controller 54, signals can be transmitted directly to the HVAC System 58 to share information with HVAC within each of the zones of the zone controllers, or those signals could be sent to the master controller server 50, which would communicate with the HVAC System 58 to share information with the HVAC within each zone, or those signals could be sent to a completely separate HVAC server (not shown) for sharing information with the HVAC. Similar types of arrangements could be provided for controlling other building systems.

Also shown in FIG. 4 is a remote connection option, for example, through a wired or wireless Internet 62 connection, which can be used to control and monitor all aspects of the system. Internet control of the lighting/building control system is preferably browser based so no specialty software is required to be installed on the remote computer used to control the system. This connection enables long-range remote management and monitoring of the system. Remote control of the sensor also allows for easy access and manipulation of the several devices controlled by the adapter. For instance, if an adapter is installed at the consumer's place of business, the consumer can activate the lighting and HVAC system from home such that the business will be heated and lit by the time the consumer arrives at the place of business. Employers can also use the remote monitoring to track their employee's hours and location in the controlled space. The remote system also enables the operator of the controlled space to out source control of all of the monitored and controlled system to a third party, that might be able to help the operator achieve the greatest efficiency out of the system. Because the third party might be controlling many systems at once for different operators, the cost to each operator could be substantially less than the cost to the operator to hire their own personnel locally to manage the system.

The present invention, while illustrated and described in terms of a preferred embodiment and several alternatives, is not limited to the particular description contained herein. Additional alternative or equivalent components and steps could be used to practice the present invention.

The invention claimed is:

1. An automated control system, comprising:
    a plurality of lighting zone controllers, each lighting zone controller including a central processor, a memory and an I/O port, and operative to control a plurality of lights within a zone based on a motion signal from a motion detector received by the I/O port, each lighting zone controller being operative to independently control the plurality of lights without external program control, to measure a first amount of energy utilized by the plurality of lights within the zone, determine a difference between the first amount of energy and a second amount of energy representing energy utilized by the plurality of lights without each lighting zone controller, and computing a savings amount based on multiplying the difference by a power company energy rate;
    a master controller for providing external program control of at least the plurality of lighting zone controllers; and
    a communications controller for managing data flow between the master controller and the plurality of lighting zone controllers.

2. The automated control system as recited in claim 1, wherein the plurality of lighting zone controllers are further operative to control the plurality of lights within the zone based on a light level signal from a light level sensor.

3. The automated control system as recited in claim 2, wherein the plurality of lighting zone controllers are further operative to control the plurality of lights within the zone based on an input signal from a security sensor.

4. The automated control system as recited in claim 2, wherein the plurality of lighting zone controllers are further operative to control the plurality of lights within the zone based on an input signal from a life safety sensor.

5. The automated control system as recited in claim 1, wherein the plurality of lighting zone controllers are further operative to control the plurality of lights within the zone based on an output light level signal.

6. The automated control system as recited in claim 1, wherein the plurality of lighting zone controllers are further operative to control the plurality of lights within the zone based on an on/off signal.

7. The automated control system as recited in claim 1, wherein the plurality of lighting zone controllers are operative to control the amount of light within the zone based on a shade control signal output to one or more automated window shades within the zone.

8. The automated control system as recited in claim 1, wherein the plurality of lighting zone controllers are operative to control the amount of light within the zone based on a light level control signal output to the plurality of lights within the zone.

9. The automated control system as recited in claim 8, wherein the plurality of lighting zone controllers are operative to control the amount of light within the zone based on a shade control signal output to one or more automated window shades with the zone.

10. The automated control system as recited in claim 1, further comprising an HVAC system in communication with the master controller, and wherein the plurality of lighting zone controllers are operative to control a ventilation temperature within the zone based on a ventilation control signal output to one or more automated vents within the zone.

11. The automated control system as recited in claim 10, wherein the HVAC system is in communication with the master controller through the communications controller and the communications controller is operative to manage data flow between the master controller and the HVAC system.

12. The automated control system as recited in claim 1, wherein the master controller is connected to an Internet and operative to be controlled via an Internet browser for remote management and monitoring.

13. The automated control system as recited in claim 1, wherein the master controller is operative to provide measurable and verifiable energy cost savings generated by each lighting zone controller during use.

14. The automated control system as recited in claim 1, wherein the motion detector includes a PIR sensor, a microwave sensor and an ultrasonic sensor.

15. An automated control system for regulating lighting levels within a controlled space, comprising:
  a plurality of lighting zone controllers, each lighting zone controller including a central processor, a memory and an I/O port, and operative to independently control the plurality of lights without external program control, each lighting zone controller further being operative to control a plurality of lights within a corresponding zone within the controlled space based on a motion signal from a motion detector received by the I/O port and based on a light level signal from a light level sensor received by the I/O port, each lighting zone controller further being operative to measure a first amount of energy utilized by the plurality of lights within the corresponding zone, determine a difference between the first amount of energy and a second amount of energy representing energy utilized by the plurality of lights without each lighting zone controller, and computing a savings amount based on multiplying the difference by a power company energy rate;
  a master controller for providing program control of at least the plurality of lighting zone controllers; and
  a communications controller for managing data flow between the master controller and the plurality of lighting zone controllers.

16. The automated control system as recited in claim 15, wherein each of the lighting zone controllers are further operative to control the plurality of lights within the corresponding zone based on a shade control signal output to one or more automated window shades within the corresponding zone, whereby lighting levels are regulated within the controlled space by using controlled amounts of daylight in combination with or in place of light generated by the plurality of lights.

17. The automated control system as recited in claim 16, wherein the master controller is connected to an Internet and operative to be controlled via an Internet browser for remote management and monitoring.

18. The automated control system as recited in claim 16, wherein the master controller is operative to provide measurable and verifiable energy cost savings generated by each lighting zone controller during use.

19. The automated control system as recited in claim 16, wherein the motion detector includes a PIR sensor, a microwave sensor and an ultrasonic sensor.

20. A method for regulating lighting levels within one or more zones having one or more lights and one or more windows, comprising the steps of:
  measuring light levels within a zone and generating a corresponding light level signal for input to a lighting zone controller within the zone, the lighting zone controller including an input/output port for receiving input signals and transmitting output signals, a central processor for processing input signals and generating output signals, and a memory for storing zone data and program controls;
  opening or closing one or more automated window shades over the one or more windows based on a shade control signal output by the light zone controller, the shade control signal being determined by the central processor based on the corresponding light level signal;
  increasing or decreasing the one or more lights within the zone based on the shade control signal;
  measuring a first amount of energy utilized by the one or more lights and the one or more automated window shades within the zone;
  determining a difference between the first amount of energy and a second amount of energy representing energy utilized by the one or more lights without lighting zone control; and
  computing a savings amount based on multiplying the difference by a power company energy rate.

21. The method as recited in claim 20, wherein the lighting zone controller is operative to receive a motion signal from a motion detector within the zone, and further comprising the step of turning on or off the one or more lights in the zone based on the motion signal.

22. The method as recited in claim 21, wherein the motion detector includes a PIR sensor, a microwave sensor and an ultrasonic sensor.

23. The method as recited in claim 20, further comprising the step of program controlling the lighting zone controller over an Internet.

* * * * *